United States Patent
Piedra Camacho et al.

(10) Patent No.: US 12,368,678 B2
(45) Date of Patent: Jul. 22, 2025

(54) EXPANSION OF PACKET MIRRORING FUNCTIONALITY

(71) Applicant: Hewlett Packard Enterprise Development LP, Spring, TX (US)

(72) Inventors: Rodolfo José Piedra Camacho, Cartago (CR); Alonso Jose Carvajal Rojas, San Francisco (CR); Eduardo Badilla Ramirez, Heredia (CR); Jairo Mendez, Tres Rios (CR); Maksim Nedorezov, Antelope, CA (US); Scott Arthur Jones, Rocklin, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/490,537

(22) Filed: Oct. 19, 2023

(65) Prior Publication Data

US 2025/0133029 A1  Apr. 24, 2025

(51) Int. Cl.
*G06F 15/16* (2006.01)
*H04L 47/32* (2022.01)
*H04L 49/55* (2022.01)

(52) U.S. Cl.
CPC ........... *H04L 47/32* (2013.01); *H04L 49/55* (2013.01)

(58) Field of Classification Search
CPC ................ H04L 47/32; H04L 49/55
See application file for complete search history.

(56) References Cited

U.S. PATENT DOCUMENTS

| | | | | |
|---|---|---|---|---|
| 7,626,938 B1* | 12/2009 | Orr | .......... | H04L 43/00 370/251 |
| 8,650,389 B1* | 2/2014 | Thornewell | ............. | H04L 69/40 713/168 |
| 8,819,213 B2* | 8/2014 | Frattura | .............. | H04L 67/1095 709/224 |
| 2004/0003094 A1* | 1/2004 | See | ......... | H04L 43/026 709/227 |
| 2005/0278565 A1* | 12/2005 | Frattura | .............. | H04L 63/0407 714/5.1 |
| 2006/0143300 A1* | 6/2006 | See | ......... | H04L 43/026 709/227 |
| 2006/0176880 A1* | 8/2006 | Bare | ........ | H04L 45/24 370/392 |
| 2011/0268096 A1* | 11/2011 | Lauer | ................. | H04B 7/18508 370/338 |
| 2014/0010096 A1* | 1/2014 | Kamble | ................ | H04L 49/354 370/252 |
| 2014/0280887 A1* | 9/2014 | Kjendal | ................. | H04L 43/12 709/224 |

(Continued)

*Primary Examiner* — Razu A Miah
(74) *Attorney, Agent, or Firm* — Yao Legal Services, Inc.

(57) ABSTRACT

One aspect of the instant application can provide a system and method for packet mirroring. During operation, the system can determine, at a networking device, whether a packet meets a mirror trigger condition based on a first mirror criterion. In response to determining that the mirror trigger condition is met, the system can use a flexible hardware circuit to select, from a plurality of mirror passages, a particular mirror passage based on a second mirror criterion. The system can send the packet to the selected mirror passage, and the selected mirror passage can generate a replicate packet and process the replicate packet.

18 Claims, 6 Drawing Sheets

(56) References Cited

U.S. PATENT DOCUMENTS

2015/0120916 A1* 4/2015 Frattura .................. H04L 63/10
709/224
2017/0223103 A1* 8/2017 Keesara .............. H04L 67/1095
2017/0339074 A1* 11/2017 Melman .............. H04L 49/9084

* cited by examiner

EXPANSION OF PACKET MIRRORING FUNCTIONALITY

BACKGROUND

Field

This disclosure is generally related to packet mirroring. More specifically, this disclosure is related to using flexible hardware circuitry to expand the packet mirroring functionality of networking devices.

BRIEF DESCRIPTION OF THE FIGURES

In the figures, like reference numerals refer to the same figure elements.

DETAILED DESCRIPTION

Figure 1:
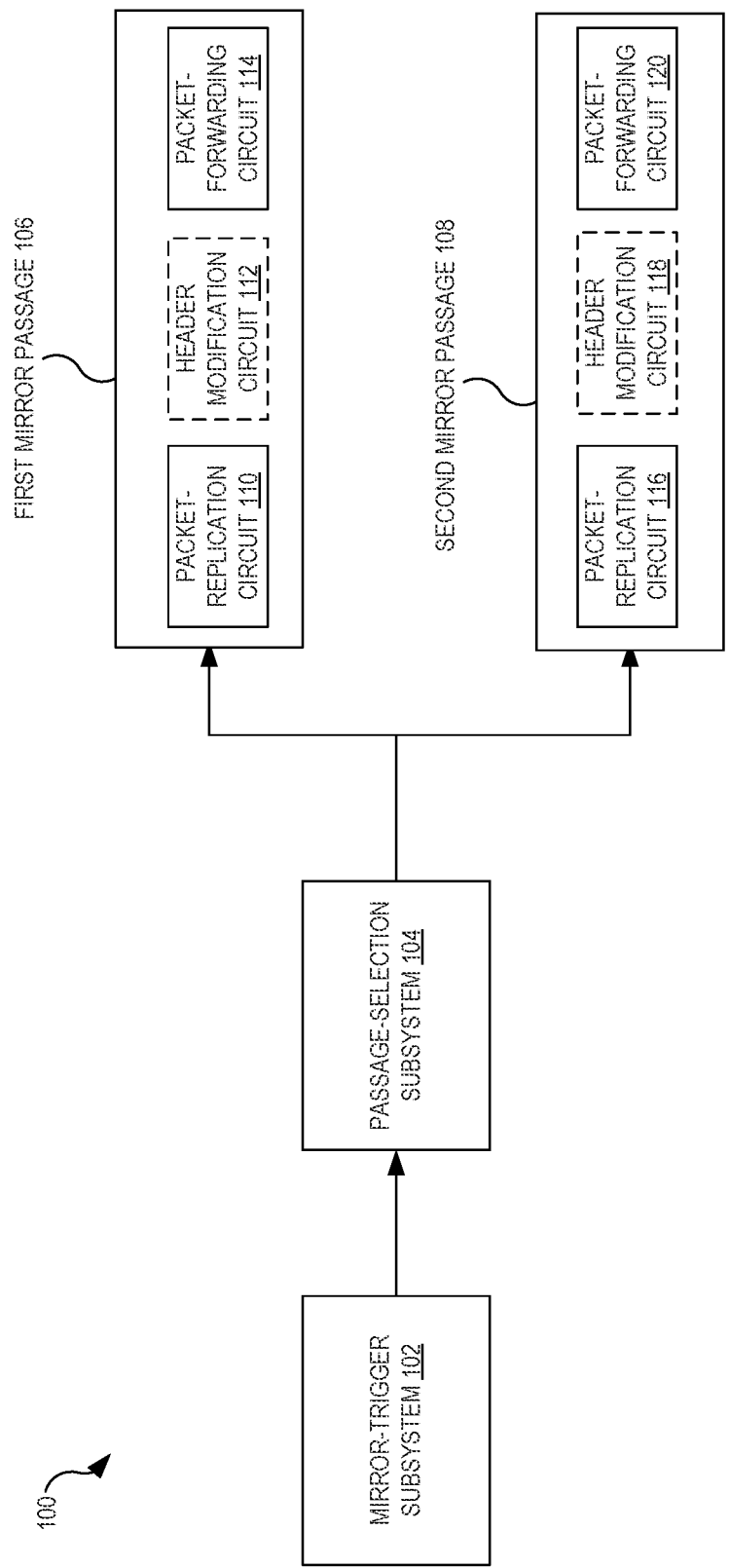
FIG. 1 illustrates an example block diagram of a packet-mirroring hardware system, according to one aspect of the instant application.

Packet mirroring is an essential tool for network trouble shooting, threat detection, and traffic analysis. Data packets received at or sent from a particular networking device (e.g., a switch or router) can be mirrored or replicated and sent to a destination different from that of the original packets for analysis or monitoring purposes. Packet mirroring can allow network administrators, security professionals, and network analysts to examine the traffic by inspecting the replicate packets without interrupting the original traffic flow.

Packet mirroring can be implemented using either hardware or software methods. Hardware-based packet-monitoring solutions typically use specially designed networking devices (e.g., network switches or routers with mirroring capability) to replicate and forward packets, whereas software-based packet-monitoring solutions rely on software tools or applications running on a host (e.g., a client or a server) within the network. Hardware-based packet mirroring often outperforms software-based packet mirroring in terms of performance, scalability, and reliability. However, conventional hardware-based packet-mirroring solutions typically are less flexible than software-based tools because they often operate based on a trigger condition that is hardcoded during device manufacturing. Once manufactured and deployed, the networking device is incapable of differentiating packets beyond the trigger condition. For example, when a switch is manufactured, its packet-processing application-specific integrated circuit (ASIC) can be designed to mirror packets with a size exceeding a predetermined threshold. After the deployment of the switch, the network administrator may also want to, for analysis or security purposes, distinguish Internet protocol (IP) version 4 (IPv4) traffic from IPv6 traffic. The hardcoded, packet-size-based trigger condition cannot provide a way to make such a differentiation.

To expand the hardware-based packet-mirroring functionality beyond the simple trigger condition, according to some aspects of the instant application, the packet-mirroring hardware (which can be part of the device ASIC) in a networking device can include multiple mirror passages, with each mirror passage containing the necessary hardware components (e.g., digital circuits) for packet mirroring. The multiple mirror passages can be independent of each other. A programmable hardware logic unit (also referred to as a flexible hardware circuit) can be programmed to define different customized mirror events (referred to as flex events) based on various packet fields (e.g., MAC address, IP address, packet size, protocol type, etc.) to provide finer granularity to the packet mirroring behavior. More specifically, the different flex events can be mapped to different mirror passages to allow flexibility in the manipulation of replicate packet flows, as the different mirror passages process the mirrored flow differently. For example, a mirrored flow may be preserved, dropped, or sent to different destinations. Because the flexible hardware circuit can be programmed based on the user's need, the solution enhances the flexibility of the packet mirroring hardware. A user can modify the mirroring behavior of the networking device by reprogramming/reconfiguring the flexible hardware circuit, even though the ASIC defining the mirror-trigger condition cannot be modified after the networking device is manufactured. Note that a networking device can refer to a physical device that enables communication and interaction among devices within a computer network. Examples of a networking device can include but are not limited to a switch, a router, a bridge, a hub, a gateway, an access points, etc.

FIG. 1 illustrates an example block diagram of a packet-mirroring hardware system, according to one aspect of the instant application. A packet-mirroring hardware system 100 can be part of the ASIC of a networking device and can include a plurality of function blocks or circuits. A set of function blocks can form a subsystem capable of performing a particular function. In this example, packet-mirroring hardware system 100 can include a mirror-trigger subsystem 102, a passage-selection subsystem 104, a first mirror passage 106, and a second mirror passage 108. Each mirror passage can also be a subsystem that includes a number of ASIC function blocks or circuits. For example, a mirror passage can include a packet-replication circuit, an optional header-modification circuit, and a packet-forwarding circuit. In the example shown in FIG. 1, first mirror passage 106 can include a packet-replication circuit 110, an optional header-modification circuit 112, and a packet-forwarding circuit 114; and second mirror passage 108 can include a packet-replication circuit 116, an optional header-modification circuit 118, and a packet-forwarding circuit 120.

Mirror-trigger subsystem 102 can include a number of hardware circuits that interact with each other to determine whether an incoming packet meets a predetermined packet-mirroring condition. Each circuit can include various types of fixed hardware circuit components (e.g., logic gates, registers, comparators). According to some aspects, depending on a predetermined packet-mirroring condition, mirror-trigger subsystem 102 can extract packet information from one or more header fields of the incoming packet, including but not limited to a source address field, a destination address field, a length field, a protocol type field, a tag field, etc. For example, if the predetermined packet-mirroring condition is to mirror all packets exceeding a predetermined length, mirror-trigger subsystem 102 can extract the packet length information from the length field of the incoming packet. In another example, the predetermined packet-mirroring condition may be based on a predetermined source address (i.e., mirroring all packets originated from a particular source), and mirror-trigger subsystem 102 can extract the source address of a packet from its source address header field and compare the extracted source address with the predetermined source address. If the extracted packet information matches the predetermined packet-mirroring condition, the packet can be sent to passage-selection subsystem 104.

Passage-selection subsystem 104 can include a number of hardware circuits that interact with each other to select, from a plurality of mirror passages on the networking device, a mirror passage for performing the packet-mirroring operation. According to some aspects, each mirror passage can be associated with a predetermined passage criterion, and passage-selection subsystem 104 can select the mirror passage based on the passage criterion and additional packet information extracted from the packet header. In one example, the predetermined packet-mirroring condition can be the packet size exceeding a predetermined length (meaning that all packets exceeding the predetermined length will be sent to passage-selection subsystem 104), and the passage criterion associated with each mirror passage can be the source address of the packet matching a particular address. For example, the passage criterion associated with first mirror passage 106 can be the source address of the packet matching a particular address, and the passage criterion associated with second mirror passage 108 can be the source address of the packet not matching the particular address. Hence, by comparing the source address of the packet and the two passage criteria, passage-selection subsystem 104 can select, between first and second mirror passages 106 and 108, one mirror passage to send the packet. If the packet matches the passage criterion of first mirror passage 106 (i.e., the source address of the packet matches the particular address), passage-selection subsystem 104 can then select first mirror passage 106 to send the packet. If the packet matches the passage criterion of second mirror passage 108 (i.e., the source address of the packet does not match the particular address), passage-selection subsystem 104 can then select second mirror passage 106 to send the packet.

According to some aspects, passage-selection subsystem 104 can include one or more flexible hardware circuits that can be reprogrammed based on user needs. Note that conventional hardware circuit components (e.g., conventional ASIC function blocks) in networking devices can include integrated circuits that are designed to fit a specific purpose and can be rigid. For example, mirror-trigger subsystem 102 can be designed to include circuit components that are designed to inspect a certain packet header field (e.g., the packet-length field) and compare the header information with a predetermined trigger condition (which can be stored in registers). Once the networking device is manufactured and deployed in the field, mirror-trigger subsystem 102 can no longer be modified. In other words, the circuit components for inspecting the packet-length field cannot be modified to inspect other packet headers. On the contrary, the flexible hardware circuits in passage-selection subsystem 104 can be reconfigured or reprogrammed to perform different operations such that the user can modify the passage criteria as needed after the networking device has been manufactured and deployed.

According to further aspects, the flexible hardware circuit can access an onboard memory device (e.g., a Random Access Memory (RAM) or Ternary Content-Addressable Memory (TCAM) device, which is not shown in FIG. 1) to obtain user instructions that can reprogram or reconfigure passage-selection subsystem 104. For example, instead of selecting a mirror passage based on the source address of a packet, passage-selection subsystem 104 can be reconfigured or reprogrammed to select a mirror passage based on the destination address of the packet. Alternatively, passage-selection subsystem 104 can be reconfigured or reprogrammed to select a mirror passage based on whether the packet comprises a virtual local area networking (VLAN) tag. According to further aspects, the flexible hardware circuit can be reconfigured or reprogrammed during runtime. For example, the user or network administrator of a networking device can write instructions into its onboard memory during runtime (e.g., when the networking device is receiving and forwarding packets), and passage-selection subsystem 104 can change its behavior accordingly.

In the example shown in FIG. 1, packet-mirroring hardware system 100 includes two mirror passages 106 and 108. In practice, depending on the available hardware resources, a networking device (e.g., a switch or router) can have an arbitrary number of mirror passages. In one example, a networking device can have up to 20 mirror passages. When there are multiple mirror passages, passage-selection subsystem 104 can perform a table lookup to match a packet to a particular mirror passage based on the passage criteria of each mirror passage and the packet information. The packet can then be sent to the matched mirror passage. In addition to one-to-one mapping, one-to-many mapping is also possible, meaning that a packet may be sent to multiple mirror passages such that multiple mirror actions may be performed on the replications of the same packet. According to some aspects of the instant application, the flexible hardware circuit in passage-selection subsystem 104 can build a lookup key using the instructions stored in the onboard memory. More specifically, the lookup key can be built based on information included in various packet header fields. For a network switch, the lookup key can be built based on a portion of the internal Forwarding Engine (FE) metadata. According to alternative aspects, the lookup key can be used to look up a resource (e.g., a memory) which returns specific data that can be merged into the FE metadata. More specifically, additional instructions can be used to flexibly merge the lookup result into the FE metadata, which can in turn influence other hardcoded lookups in the packet-processing pipeline. The flexible hardware circuit can also include a special calculation unit that can perform basic arithmetic and Arithmetic Logic Unit (ALU) type operations on the FE metadata. For example, the flexible hardware circuit can modify a certain field of a packet by performing an XOR operation between the field and a predetermined logical value. Compared with other hardcoded FE lookups that cannot be modified, the lookup performed by the flexible hardware circuit can allow for behavioral changes of the lookups at runtime.

Each mirror passage can include hardware components (e.g., gates and registers) designed to perform various packet-processing functions. In the example shown in FIG. 1, each mirror passage can include a packet-replication circuit that can create replicates of the packet. The number of replicate packets can vary depending on the configuration of the packet-replication circuit. For example, the packet-replication circuit may generate one or multiple copies of a packet.

The mirror passage can include an optional header modification circuit that can modify the header of the packet when needed. For example, the optional header modification circuit can add an extra header to the replicate packet. The extra header can include the packet metadata, a virtual local area networking (VLAN) tag, etc. For example, if the replicate packet is to be transported over a tunnel, the header modification circuit can attach a VLAN tag to the packet. The optional header modification circuit can also modify any header field, including but not limited to the source/destination address, the protocol type, the port number, etc.

The mirror passage can also include a packet-forwarding circuit responsible for forwarding the replicate packets. For example, a replicate packet can be forwarded to a drop port or a mirror-out port on the networking device. The mirror-out port may be coupled to an external packet analyzer (which is not part of the networking device) that can analyze the replicate packets. Alternatively, the mirror-out port can be coupled to a remote destination (e.g., a security monitoring system that is coupled to the networking device via a communication network such as the Internet). When there are multiple replicate packets in the mirror passage, the packet-forwarding circuit can forward the multiple replicate packets to multiple destinations. The mirror-out port can be any one of the network or fabric ports shown in FIGS. 3 and 4, whereas the drop port can be a dedicated port on the networking device used for discarding packets. Depending on the implementation, the drop port can be an internal port, or a network or fabric port on the networking device can be configured as a drop port.

In the example shown in FIG. 1, the various subsystems and circuits are shown as separate components. In practice, they can be placed on separate ASIC chips or integrated on the same ASIC chip. It is also possible to group the subsystems or circuits into one or more subsets and place each subset onto one ASIC chip.

Figure 2:
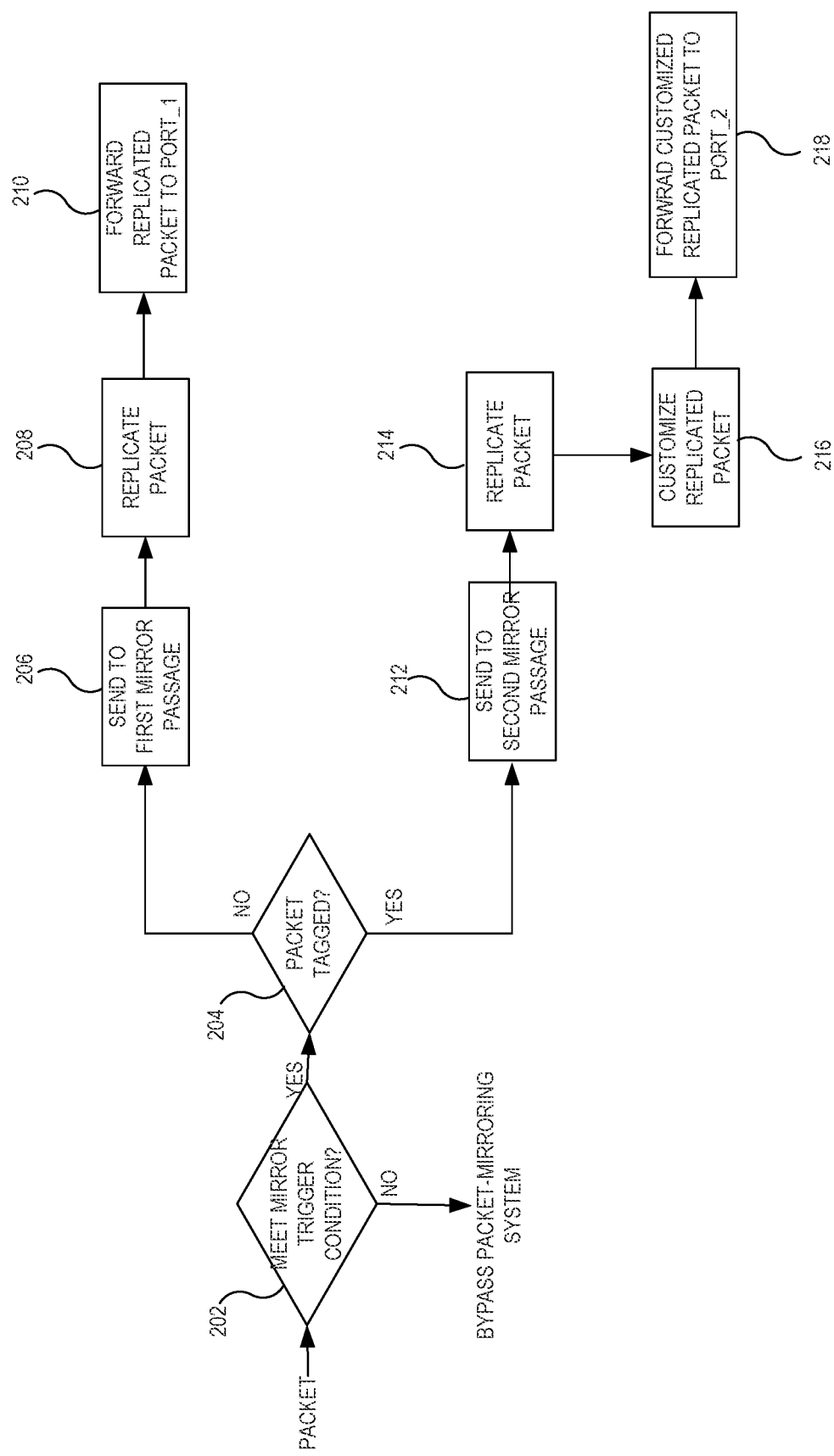
FIG. 2 illustrates an example packet-mirroring scenario, according to one aspect of the instant application.

FIG. 2 illustrates an example packet-mirroring scenario, according to one aspect of the instant application. This example can be applied to the egress mirroring of encapsulated packets at a networking device such as a network switch. More specifically, as a packet leaves the network switch (e.g., as the packet going through the packet-processing pipeline to be placed in a particular egress queue), the mirror-trigger circuit (which can be part of the packet-processing pipeline) can determine whether the packet meets a predetermined mirror trigger condition (operation 202). More specifically, the mirror-trigger circuit can include fixed hardware circuit components designed to gather packet information from a number of predetermined packet fields and compare the gathered information with the predetermined mirror trigger condition. For example, the mirror trigger condition can be a particular source address, and the mirror-trigger circuit can include a particular circuit component to extract the source address from the packet. The mirror-trigger circuit can further include a comparator that can compare the packet's source address with the mirror trigger condition. If the packet does not meet the mirror trigger condition (e.g., it has a different source address), the packet can bypass the packet-mirroring system and be sent to a corresponding egress queue before exiting the switch.

If the packet meets the mirror trigger condition (e.g., the packet's source address matches the source address specified by the mirror trigger condition), a flexible hardware circuit (which can be programmed to perform different actions) can inspect other sections of the packet to determine whether the packet is tagged (operation 204). More specifically, the flexible hardware circuit can load special instructions from the on-switch memory and use the instructions to inspect predetermined packet fields. In this example, the flexible hardware circuit can inspect a tag field to determine whether the packet header includes a VLAN tag. If the packet is not tagged, the networking device (or more specifically the flexible hardware circuit within the networking device) can send the packet to a first mirror passage (operation 206).

The networking device or switch (or more specifically a packet-replication circuit in the first mirror passage) can replicate the untagged packet (operation 208). In this example, the packet-replication circuit can create one copy of the original packet. In a different example, the packet-replication circuit can create multiple copies. The replicate packet can then be forwarded to a predetermined port_1 of the switch by a packet-forwarding circuit (operation 210). Note that both the packet-replication circuit and the packet-forwarding circuit can include hardware components that can perform the packet replication and forwarding operations at the line rate (i.e., at the rate the packets arrive at the switch).

If the packet is tagged, the networking device (or more specifically the flexible hardware circuit) can send the packet to the second mirror passage (operation 212), and the packet-replication circuit in the second mirror passage can replicate the tagged packet (operation 214). Similarly, one copy of the original packet can be created in the second mirror passage.

The second mirror passage can also include a packet-modification circuit. The replicate packet can be customized by the packet-modification circuit (operation 216). In this example, the replication of the tagged packet may have its source address field modified. The customized replicate packet can then be forwarded to a predetermined port_2 of the switch. In one example, port_2 of the switch can be coupled to a security analyzer that can analyze the packet for security purposes.

One can see from FIG. 2 that the switch changes its packet-mirroring behavior based on whether a packet is tagged or not. The replication of an untagged packet can be sent to one port (which can be different from the port the original packet is sent to), whereas the replication of a tagged packet can be modified and sent to a different port. In one example, port_1 can be a drop port and port_2 can be coupled to a packet analyzer, meaning that only the tagged packets will be analyzed. Compared with the conventional hardware-based mirroring solution that relies on a single mirror trigger condition, the proposed enhanced packet-mirroring solution can provide a higher level of granularity without affecting the system's performance. The granularity can be improved further when the number of mirror passages increases.

According to some aspects, the packet mirroring may be performed in conjunction with a recirculation port on the switch. The recirculation port can be a dedicated internal or external port on the switch and can be different from the network or fabric ports shown in FIGS. 3 and 4. In response to an egress packet meeting the mirror trigger condition, the packet can be forwarded to the recirculation port, which can redirect the packet back into the packet-processing pipeline for additional processing. In one example, the passage-selection subsystem and the mirror passages can be part of the packet-processing pipeline. For simplicity, the recirculation of the packet is not shown in FIG. 2.

Figure 3:
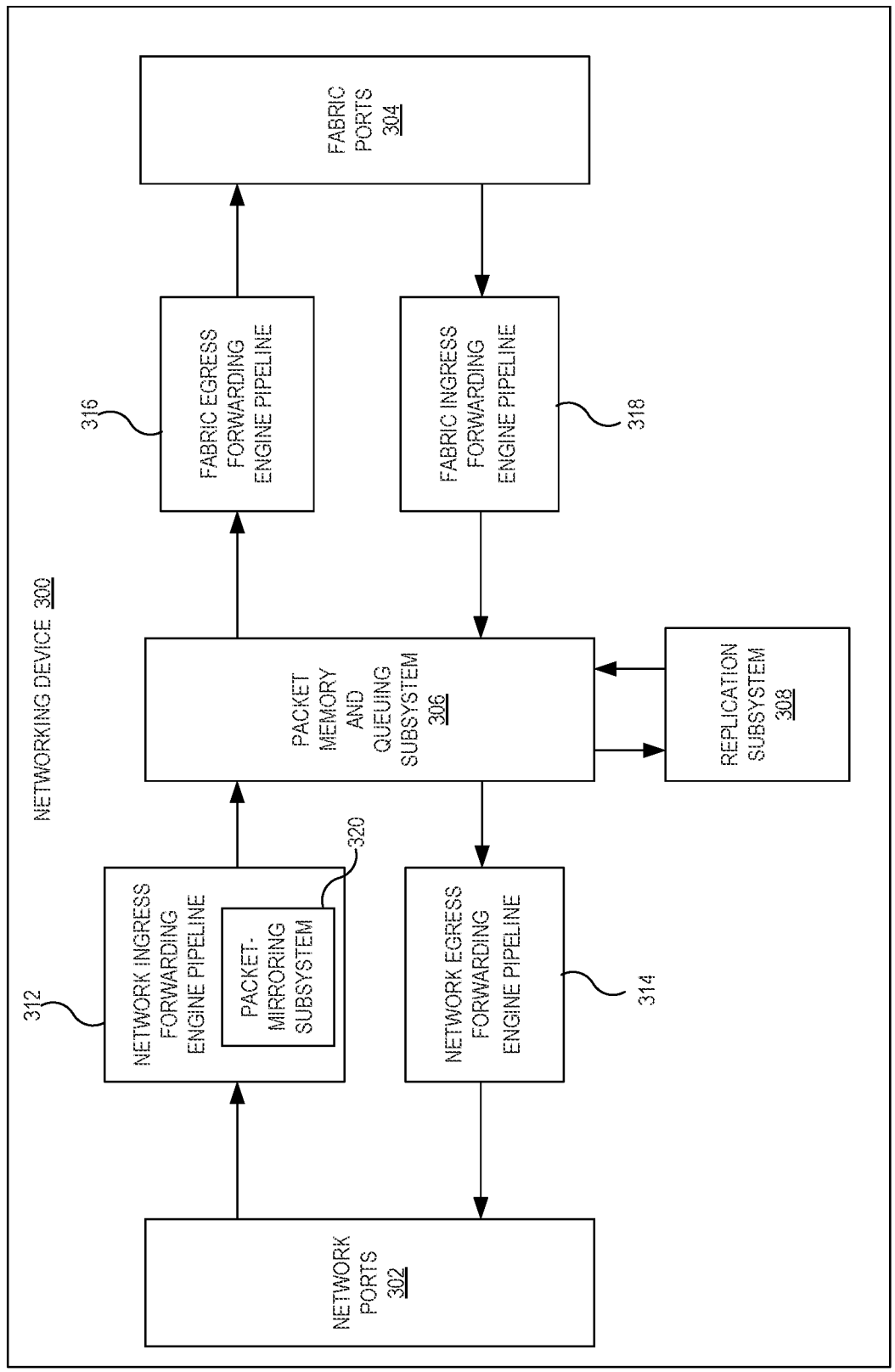
FIG. 3 illustrates an example block diagram of a networking device implementing enhanced packet mirroring, according to one aspect of the instant application.

FIG. 3 illustrates an example block diagram of a networking device implementing enhanced packet mirroring, according to one aspect of the instant application. In this example, networking device 300 can be a network switch with the capability of forwarding layer 2 (L2) packets based on Media Access Control (MAC) addresses. In alternative examples, networking device 300 can also be a network router with the capability of routing layer 3 (L3) packets based on IP addresses. It is also possible that networking device 300 can be a switch with routing capabilities and vice versa. Packet mirroring can be performed by any networking device, which can be a switch, a router, or combination thereof. Networking device 300 can include a number of hardware components or hardware subsystems for performing various packet-processing functions, including a plurality of network ports 302, a plurality of fabric ports 304, a packet memory and queueing subsystem 306, a replication subsystem 308, and a number of forwarding engine (FE) pipelines. The hardware components or hardware subsystems can be implemented using ASIC function blocks. For example, network ports 302 or fabric ports 304 can include both the physical connectors and a port-controller ASIC, and packet memory and queuing subsystem 306 can include ASIC blocks that function as packet buffers and ASIC blocks that function as queue controllers. In one example, all components and subsystems shown in FIG. 3 can be integrated into a single ASIC chip. In another example, the various components and subsystems can be placed onto multiple ASIC chips. Networking device 300 can also include a processor and a memory, which are not shown in FIG. 3. Using a network switch as an example, the processor can load instructions from the memory to perform many functions essential to the performance of the network switch, such as making forwarding decisions, managing configurations, enforcing security policies, monitoring performance, etc.

Network ports 302 are coupled to the network and can receive packets from and transmit packets to the network. Fabric ports 304 are coupled to the switch fabric and can receive packets from and transmit packets to a switch fabric comprising a plurality of interconnected switches. Packet memory and queueing subsystem 306 can include a plurality of queues for queuing incoming and outgoing packets for each port. In one example, the ingress/egress queues associated with a particular port can include multiple traffic-class queues. Other types of queuing mechanisms (such round robin, priority-based, etc.) are also possible. The scope of this disclosure is not limited by the packet queuing mechanism. Replication subsystem 308 can be responsible for replicating packets. For example, replication subsystem 308 may receive a packet from packet memory and queuing subsystem 306, perform the packet replication, and return the replicate packet to packet memory and queuing subsystem 306.

A FE pipeline (also referred to as a packet-processing pipeline) can include a number of hardware stages for processing packets, including stages for parsing the packets, looking up addresses, enforcing policies, etc. Each hardware stage can include one or more ASIC function blocks. Because a packet can go through these hardware stages one stage at a time, these stages are collectively referred to as a pipeline. On the network side, networking device 300 can include network ingress FE pipeline 312 for processing packets received from network ports 302 before queueing the processed packets in packet memory and queuing subsystem 306. Networking device 300 can also include network egress FE pipeline 314 for processing packets exiting networking device 300 to the network. On the fabric side, networking device 300 can include fabric ingress FE pipeline 318 for processing packets received from fabric ports 304 and fabric egress FE pipeline 316 for processing packets exiting networking device 300 to the fabric via fabric ports 304.

In the example shown in FIG. 3, the packet mirroring can be ingress mirroring. More specifically, network ingress FE engine pipeline 312 can include a packet-mirroring subsystem 320 that can operate in conjunction with replication subsystem 308 to selectively generate replication packets based on at least a hardcoded first mirror criterion or strategy and a flexibly coded second mirror criterion or strategy. According to some aspects, packet-mirroring subsystem 320 can include a number of ASIC function blocks that are part of a large ASIC for network ingress FE pipeline 312. Packet-mirroring subsystem 320 can include a fixed mirror-trigger circuit that performs actions based on the first mirror criterion or according to the first mirror strategy. The first mirror criterion is hardcoded by the switch manufacturer and cannot be modified after networking device 300 has been manufactured and deployed in the field. In one example, the fixed mirror-trigger circuit can be designed to inspect a particular section of the packet, such as the packet length field or the source/destination address field. The fixed mirror-trigger circuit typically ignores other sections of the packet.

Packet-mirroring subsystem 320 can also include multiple mirror passages and a flexible mirror-passage-selection circuit that performs actions based on the second mirror criterion or according to the second mirror strategy. The flexible mirror-passage-selection circuit allows a user to modify the second mirror criterion when needed. More specifically, the user can write special instructions into the on-switch memory, and the flexible mirror-passage-selection circuit can use the special instructions to construct a lookup key based on a section of interest in the packet. For example, the lookup key can be associated with one or more particular packet fields. The lookup key can be used to match the packet to a mirror passage from a plurality of mirror passages, with different mirror passages configured to perform different mirror actions, such as duplicating, dropping, redirecting, modifying, etc. According to some aspects, the flexible mirror-passage-selection circuit can generate the lookup key based on one or more header fields of the packet. In one example, the second mirror criterion can be directing the mirrors of tag packets to a predetermined destination and disabling the mirroring of untagged packets. Accordingly, for each tagged packet, the flexible mirror-passage-selection circuit can select a mirror passage that is configured to replicate the packet and forward the replicate packet to the predetermined destination. On the contrary, for each untagged packet, the flexible mirror-passage-selection circuit can select a mirror passage that is configured to disable the packet replication or forward the replicate packet to a drop port.

In one example, the first mirror criterion can indicate creating mirrors for all packets exceeding a particular size and forwarding the replicate packets to a first destination for analysis. In certain scenarios, to conserve resources used to transmit and analyze the mirrored packets, the user may only wish to analyze the tagged packets. Accordingly, the user can write special instructions to modify the behavior of the flexible mirror-passage-selection circuit, causing the flexible mirror-passage-selection circuit to check whether a packet is tagged and to send the packet to the mirror passage corresponding to the packet's tag status. The tagged packet can be sent to the mirror passage that forwards the replicate packet to the packet analyzer (which can be coupled to a network port of network ports 302), whereas the untagged packet can be sent to the mirror passage that forwards the replicate packet to the drop port (which can be one of network ports 302). The replication of the tagged packet can also have its destination address field modified in the mirror passage such that the packet forwarding logic (e.g., hardware components in network ingress FE pipeline 312 and fabric egress FE engine pipeline 316) can forward the packet to the switch port coupled to the analyzer.

Figure 4:
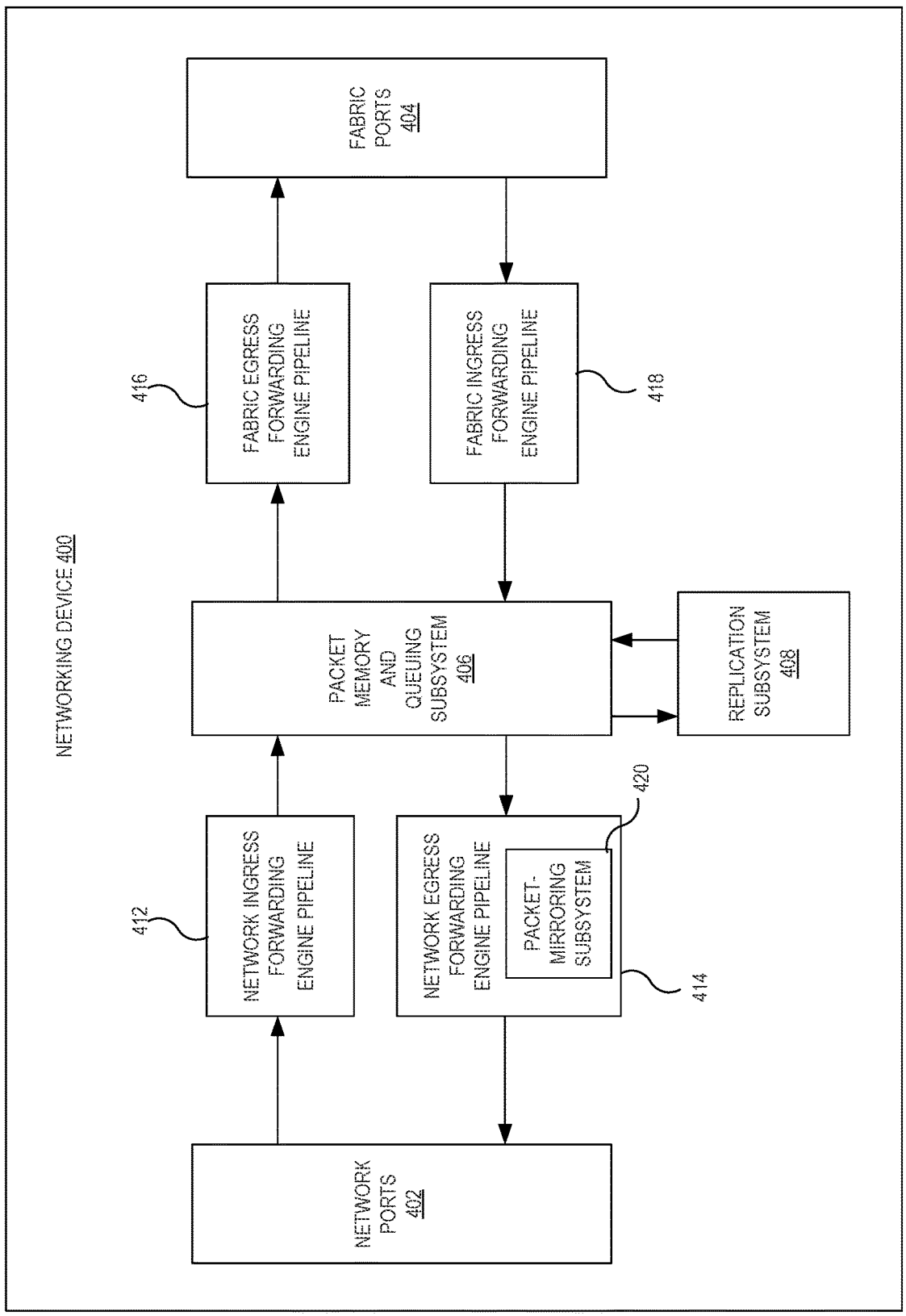
FIG. 4 illustrates an example block diagram of a networking device implementing enhanced packet mirroring, according to one aspect of the instant application.

FIG. 4 illustrates an example block diagram of a networking device implementing enhanced packet mirroring, according to one aspect of the instant application. Networking device 400 can be similar to networking device 300 shown in FIG. 3 and can include hardware subsystems such as network ports 402, fabric ports 404, packet memory and queuing subsystem 406, and replication subsystem 408. Networking device 300 can also include a number of FE engine pipelines, such as network ingress FE pipeline 412, network egress FE pipeline 414, fabric egress FE pipeline 416, and fabric ingress FE pipeline 418. These hardware components can be implemented using ASIC function blocks. Similar to FIG. 3, the various hardware subsystems shown in FIG. 4 can be integrated into a single ASIC chip or be placed onto multiple ASIC chips.

In the example shown in FIG. 4, network egress FE pipeline 414 can include a packet-mirroring subsystem 420, and the packet mirroring is performed for egress packets. According to some aspects, packet-mirroring subsystem 420 can include a number of ASIC function blocks that are part of a large ASIC for network egress FE pipeline 414. Before a packet exits networking device 300 to the network, packet-mirroring subsystem 420 can apply first and second mirror policies to the packet. The first mirror criterion can be hardcoded into a fixed mirror-trigger circuit, whereas the second mirror criterion can be flexibly coded into a flexible mirror-passage-selection circuit. More specifically, the second mirror criterion can allow mirrored flows based on the first criterion to be manipulated (e.g., modified, redirected, dropped, etc.) based on some arbitrary section of the packet. The flexible mirror-passage-selection circuit can improve the granularity and provide flexibility to the packet mirroring functionalities of the switch.

Figure 5:
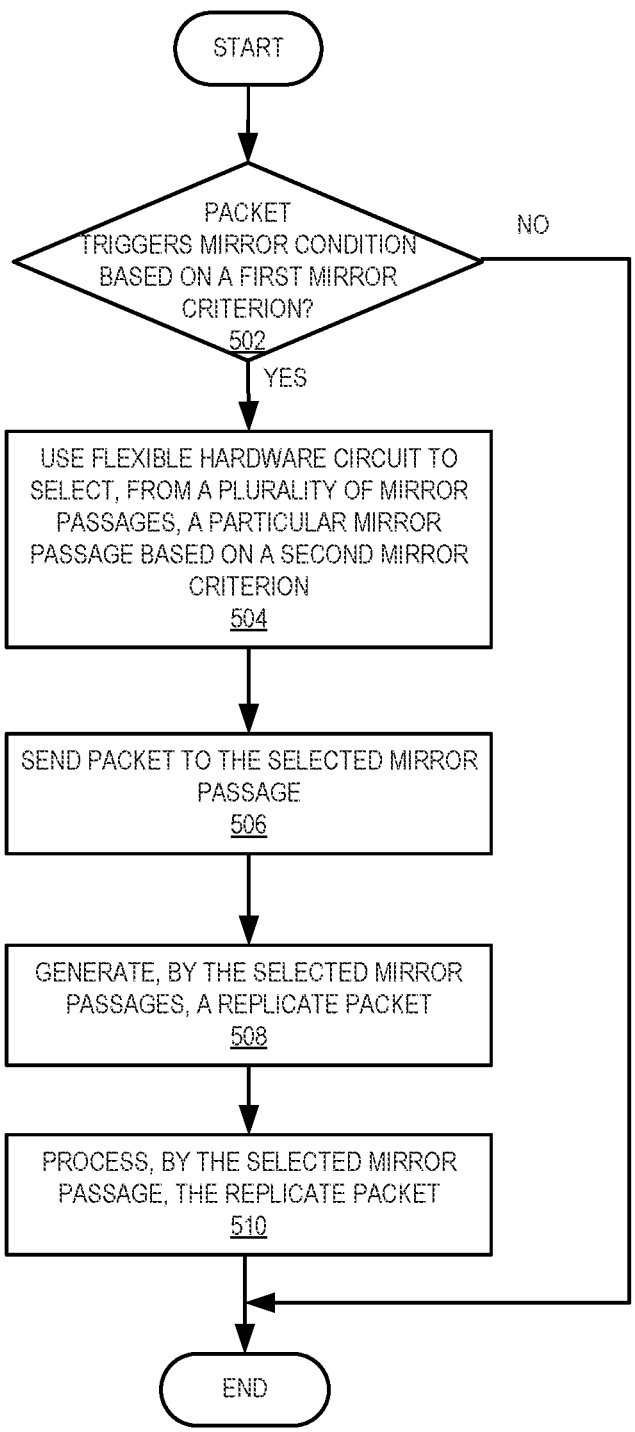
FIG. 5 provides a flowchart illustrating an example packet-mirroring process, according to one aspect of the instant application.

FIG. 5 provides a flowchart illustrating an example packet-mirroring process, according to one aspect of the instant application. During operation, the packet-mirroring system on a networking device can determine whether a packet triggers a mirror condition based on a first mirror criterion (operation 502). The packet-mirroring system can be implemented as part of the packet ingress FE pipeline to perform mirror actions on ingress packets or as part of the packet egress FE pipeline to perform mirror actions on egress packets. According to one aspect, the packet-mirroring system can include a fixed mirror-trigger circuit that can inspect a predetermined section of the packet (e.g., one or more header fields) to extract first packet information (e.g., the size of the packet). The fixed mirror-trigger circuit can then determine whether the ingress or egress packet triggers a mirror condition based on the first packet information and the first mirror criterion. The first mirror criterion is hardcoded and cannot be modified once the networking device is manufactured and deployed.

If the packet does not trigger the mirror condition, the entire packet-mirroring process can be bypassed and the process ends. If the packet triggers the mirror condition, the packet-mirroring system can use a flexible hardware circuit to select, from a plurality of mirror passages, a particular mirror passage based on a second mirror criterion (operation 504). According to some aspects, the flexible hardware circuit can be programmed or configured by the user to inspect a different section of the packet to extract second packet information (e.g., the tag status). The first packet information and the second packet information can be different. The packet-mirroring system has a plurality of mirror passages, with each mirror passage configured to perform certain mirror actions (e.g., replicating, redirecting, dropping, modifying, etc.). The flexible hardware circuit can select a mirror passage based on the second packet information and the second mirror criterion. For example, the flexible hardware circuit can select a first mirror passage for tagged packets and a second mirror passage for untagged packets.

The packet-mirroring system can send the packet to the selected mirror passage (operation 506). In the aforementioned example, the tagged packets can be sent to the first mirror passage and the untagged packets can be sent to the second mirror passage. The selected mirror passage can then generate one or more replicate packets (operation 508). For example, a packet-duplication circuit in each mirror passage can generate one or more replicate packets, and the number of replicate packets can be configured based on the user's need. For example, if the packet mirroring serves multiple purposes, such as a security purpose and a performance-monitoring purpose, the packet-duplication circuit may generate multiple replicate packets.

The packet-mirroring system can then process the replicate packets (operation 510). For example, a mirror passage may forward the replicate packets to one or more predetermined destinations or may forward the replicate packets to a drop port. The mirror passage may also modify a replicate packet (e.g., adding, removing, or modifying a header field) before forwarding it to a predetermined destination. To expand the functionality of packet mirroring, the different mirror passages may process the replicate packets differently. In one example, the packets are transported over a tunnel interface and can include tagged and untagged packets. One mirror passage corresponding to the tagged packets can reroute copies of the tagged packets to a particular destination, and a different mirror passage corresponding to the untagged packets can send copies of the untagged packets to a drop port.

Figure 6:
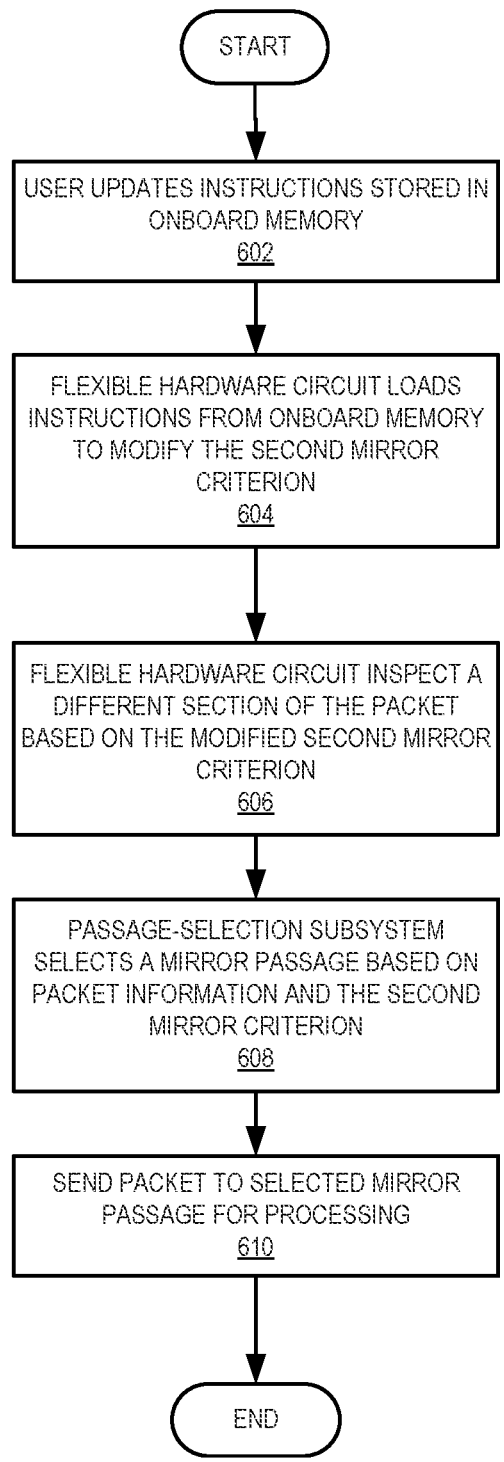
FIG. 6 presents a flowchart illustrating an example packet-mirroring process in the event of a mirror criterion update, according to one aspect of the instant application.

FIG. 6 presents a flowchart illustrating an example packet-mirroring process in the event of a mirror criterion update, according to one aspect of the instant application. During operation, a user can update the instructions stored in the onboard memory (operation 602). For example, the user may write the instructions into the memory via a user interface associated with the networking device. The flexible hardware circuit in the passage-selection subsystem can load the updated instructions from the memory to modify the second mirror criterion (operation 604). For example, a previous second mirror criterion may be based on the tag status of the packet, whereas the modified second mirror criterion may be based on the source address of the packet.

The flexible hardware circuit can inspect a different section of the packet based on the modified second mirror criterion (operation 606). In the above example, after the criterion update, instead of inspecting the tag field, the flexible hardware circuit now inspects the source address field of the packet. The flexible hardware circuit can also extract packet information from the inspected section. The passage-selection subsystem can then select a mirror passage based on the extracted packet information and the second mirror criterion (operation 608). The packet can then be sent to the selected mirror passage for processing (operation 610).

In general, the disclosure describes a system and method to expand the traditional single-trigger-based packet mirroring functionality on a networking device. To do so, the proposed packet-mirror system can include multiple mirror passages, with each mirror passage including its own hardware components for performing packet mirroring actions. The different mirror passages can be configured to perform different mirror actions. For example, one mirror passage may redirect the mirrored packets, whereas a different mirror passage may drop the mirrored packets. Moreover, in addition to a fixed mirror-trigger circuit that implements a first mirror criterion, the proposed packet-mirror system can include a flexible mirror-passage-selection circuit that implements a second mirror criterion. Packets selected for mirroring based on the first mirror criterion may be sent to different mirror passages based on the second mirror criterion. Moreover, although the first mirror criterion is hard-coded and cannot be modified after the networking device is manufactured and deployed, the second mirror criterion is flexibly coded and can be modified by the user. Compared with the traditional hardware-based mirroring solution, the proposed system can provide a deeper level of granularity and flexibility. Compared with a software-based mirroring solution, the proposed system can reduce the consumption of memory and processing resources. In the example shown in FIG. 2, each packet is sent to a mirror passage based on the second mirror criterion. In practice, it is also possible that a packet is sent to multiple (e.g., two) mirror passages such that different mirror actions can be performed on the same packet.

One aspect of the instant application can provide a system and method for packet mirroring. During operation, the system can determine, at a networking device, whether a packet triggers a mirror condition based on a first mirror criterion. In response to determining that the mirror condition is triggered, the system can use a flexible hardware circuit to select, from a plurality of mirror passages, a particular mirror passage based on a second mirror criterion. The system can send the packet to the selected mirror passage, and the selected mirror passage can generate a replicate packet and process the replicate packet.

In a variation on this aspect, processing the replicate packet can include forwarding the replicate packet to a predetermined destination port, dropping the replicate packet, or redirecting the replicate packet to a port different from the predetermined destination port.

In a variation on this aspect, selecting the particular mirror passage can include extracting packet information from one or more sections of the packet, constructing a lookup key based on the extracted packet information, and matching the packet to the selected mirror passage based on lookup key and the second mirror criterion.

In a further variation, the packet information comprises one or more of: a size of the packet; a tag associated with the packet; a protocol type associated with the packet; and a source or destination address of the packet.

In a further variation, the flexible hardware circuit modifies the second mirror criterion based on user instructions stored in a memory associated with the networking device.

In a further variation, the flexible hardware circuit extracts different packet information from a different section of the packet based on the modified second mirror criterion.

In a variation on this aspect, the packet is transported over a tunnel interface, and wherein selecting the mirror passage comprises determining whether the packet is tagged.

In a further variation, in response to determining that the packet is tagged, the system can send the packet to a first mirror passage that forwards the replicate packet to a predetermined destination; and in response to determining that the packet is not tagged, the system can send the packet to a second mirror passage that drops the replicate packet.

In a variation on this aspect, the packet is an ingress packet or an egress packet at the networking device.

In a variation on this aspect, the replicate packet is processed differently by different mirror passages.

One aspect of the instant application can provide a networking device. The networking device can include a mirror-condition trigger subsystem to determine whether a packet triggers a mirror condition based on a first mirror criterion, a plurality of mirror passages, and a mirror-passage-selection subsystem to use a flexible hardware circuit to, in response to the mirror-condition trigger subsystem determining that the mirror condition is triggered, select, from the plurality of mirror passages, a particular mirror passage based on a second mirror criterion and send the packet to the selected mirror passage. The selected mirror passage is to generate a replicate packet and process the replicate packet.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The above description is presented to enable any person skilled in art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer-readable storage medium described herein may be non-transitory.

Furthermore, the methods and processes described above can be included in hardware devices or apparatus. The hardware devices or apparatus can include, but are not limited to, application-specific integrated circuit (ASIC)

chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
   determining, by a mirror-trigger circuit at a networking device, whether a packet meets a mirror trigger condition based on a first mirror criterion;
   in response to determining that the mirror trigger condition is met, using a flexible hardware circuit to select, from a plurality of mirror passages, a particular mirror passage based on a second mirror criterion;
   sending the packet to the selected mirror passage;
   generating, by the selected mirror passage, a replicate packet;
   processing, by the selected mirror passage, the replicate packet;
   modifying, using the flexible hardware circuit based on user instructions stored in a memory associated with the networking device, the second mirror criterion; and
   selecting a different mirror passage based on the modified second mirror criterion to send a subsequent packet meeting the trigger condition.

2. The method of claim 1, wherein processing the replicate packet comprises:
   forwarding the replicate packet to a predetermined destination port;
   dropping the replicate packet; or
   redirecting the replicate packet to a port different from the predetermined destination port.

3. The method of claim 1, wherein selecting the particular mirror passage comprises:
   extracting packet information from one or more sections of the packet;
   constructing a lookup key based on the extracted packet information; and
   matching the packet to the selected mirror passage based on lookup key and the second mirror criterion.

4. The method of claim 3, wherein the packet information comprises one or more of:
   a size of the packet;
   a tag associated with the packet;
   a protocol type associated with the packet; and
   a source or destination address of the packet.

5. The method of claim 3, wherein selecting the different mirror passage further comprises extracting different packet information from a different section of the packet based on the modified second mirror criterion.

6. The method of claim 1, wherein the packet is transported over a tunnel interface, and wherein selecting the mirror passage comprises determining whether the packet is tagged.

7. The method of claim 6, wherein the method further comprises:
   in response to determining that the packet is tagged, sending the packet to a first mirror passage that forwards the replicate packet to a predetermined destination; and
   in response to determining that the packet is not tagged, sending the packet to a second mirror passage that drops the replicate packet.

8. The method of claim 1, wherein the packet is:
   an ingress packet; or
   an egress packet at the networking device.

9. The method of claim 1, wherein the replicate packet is processed differently by different mirror passages.

10. A networking device, comprising:
    a mirror-condition trigger subsystem to determine whether a packet meets a mirror trigger condition based on a first mirror criterion;
    a plurality of mirror passages; and
    a mirror-passage-selection subsystem to use a flexible hardware circuit to, in response to the mirror-condition trigger subsystem determining that the mirror trigger condition is met, select, from the plurality of mirror passages, a particular mirror passage based on a second mirror criterion and send the packet to the selected mirror passage;
    wherein the selected mirror passage is to generate a replicate packet and process the replicate packet;
    wherein the mirror-passage-selection subsystem is to use the flexible hardware circuit to modify the second mirror criterion based on user instructions stored in a memory associated with the networking device; and
    wherein, subsequent to modifying the second mirror criterion, the mirror-passage-selection subsystem is to select a different mirror passage based on the modified second mirror criterion to send a subsequent packet meeting the trigger condition.

11. The networking device of claim 10, wherein the selected mirror passage processes the replicate packet by:
    forwarding the replicate packet to a predetermined destination port;
    dropping the replicate packet; or
    redirecting the replicate packet to a port different from the predetermined destination port.

12. The networking device of claim 10, wherein, while selecting the particular mirror passage, the mirror-passage-selection subsystem is to:
    extract packet information from one or more sections of the packet;
    construct a lookup key based on the extracted packet information; and
    match the packet to the selected mirror passage based on lookup key and the second mirror criterion.

13. The networking device of claim 12, wherein the packet information comprises one or more of:
    a size of the packet;
    a tag associated with the packet;
    a protocol type associated with the packet; and
    a source or destination address of the packet.

14. The networking device of claim 12, wherein, while selecting the different mirror passage, the mirror-passage-selection subsystem is to extract different packet information from a different section of the packet based on the modified second mirror criterion.

15. The networking device of claim 10, wherein the packet is transported over a tunnel interface, and wherein, while selecting the particular mirror passage, the mirror-passage-selection subsystem is to determine whether the packet is tagged.

16. The networking device of claim 15, wherein the mirror-passage-selection subsystem is to:

in response to determining that the packet is tagged, send the packet to a first mirror passage that forwards the replicate packet to a predetermined destination; and in response to determining that the packet is not tagged, send the packet to a second mirror passage that drops the replicate packet.

17. The networking device of claim 10, wherein the packet is:

an ingress packet; or an egress packet.

18. The networking device of claim 10, wherein different mirror passages from the plurality of mirror passages are to process the replicate packets differently.

* * * * *